United States Patent
Schmidt

(10) Patent No.: US 7,500,247 B2
(45) Date of Patent: Mar. 3, 2009

(54) STACK MARSHALER

(75) Inventor: Oliver Schmidt, Worth am Rhein (DE)

(73) Assignee: SAP AG, Walldorf (DE)

(*) Notice: Subject to any disclaimer, the term of this patent is extended or adjusted under 35 U.S.C. 154(b) by 480 days.

(21) Appl. No.: 10/944,095

(22) Filed: Sep. 17, 2004

(65) Prior Publication Data

US 2006/0075393 A1    Apr. 6, 2006

(51) Int. Cl.
  G06F 3/00    (2006.01)
  G06F 9/44    (2006.01)
  G06F 9/46    (2006.01)
  G06F 13/00   (2006.01)

(52) U.S. Cl. ..................... 719/312; 719/313

(58) Field of Classification Search ............. 719/312, 719/313
See application file for complete search history.

(56) References Cited

U.S. PATENT DOCUMENTS

| | | | | |
|---|---|---|---|---|
| 6,026,428 A | * | 2/2000 | Hutchison et al. | 718/108 |
| 2003/0229766 A1 | * | 12/2003 | Dice et al. | 711/154 |
| 2004/0098364 A1 | * | 5/2004 | Liukkonen et al. | 707/1 |

OTHER PUBLICATIONS

Silberschatz et al., "Applied Operating System Concepts," First Edition, John Wiley & Sons, Inc., 2000; pp. 22-25, 39-41, 46, 51-56, 74-82, 115-132, 417-419, 424-431.*
Silberschatz et al., "Applied Operating System Concepts," First Edition, John Wiley & Sons, Inc., 2000: pp. 45-50, 57-62, 621-638.*
Murray J: Inside Microsoft Windows CE, Oct. 2, 1998, Microsoft Press, XP002357140, p. 42—p. 60.
Dik C H S: Solaris Posix Threads and Ucontext, Jul. 1, 2003, pp. 1-2, XP002357144, url: http://www.talkaboutprogramming.com/group/comp.programming.threads/messages/37374.html.
Ford B et al: Evolving Mach 3.0 to a Migrating Thread Model, Proceedings of the Winter 1994 Usenix Conference, Jan. 1994, pp. 1-18, XP002357145, url: http://www.usenix.org/publications/library/proceedings/sf94/full_papers/ford.pdf.
Franklin S et al: Is it an agent, or just a program?: A Taxonomy for Autonomous Agents, Intelligent Agents, ECAI, Workshop on Agent Theories, Architectures and Languages, 1996, pp. 1-10, XP002255762.
The IEEE and the Open Group: "makecontext, swampcontext-manipulate user contexts" The Open Group Base Specifcations Issue 6, (Jun. 30, 2004), pp. 1-4.

* cited by examiner

*Primary Examiner*—Meng-Ai An
*Assistant Examiner*—Nathan Price
(74) *Attorney, Agent, or Firm*—Blakely, Sokoloff, Taylor & Zafman LLP

(57) ABSTRACT

Systems and techniques for transferring the flow of control between agents. In one general aspect, a computer program product includes instructions operable to cause data processing apparatus to: store data on a first call stack, the first call stack corresponding to and being used by a first agent; suspend the first agent's use of the first call stack; enable a second agent to access the data by using the first call stack; and resume the first agent's use of the first call stack after the second agent is no longer using the first call stack. According to another aspect, a computer program product includes a first set of instructions that is operable to store and access data on a shared call stack; and a second set of instructions that is operable to alternate execution of the first set of instructions between a first agent and a second, distinct agent.

15 Claims, 3 Drawing Sheets

STACK MARSHALER

BACKGROUND

The present application relates to digital data processing.

A first agent (a source agent, e.g., a thread or an operating system process) sometimes seeks to execute code in a second agent (a target agent, e.g., another thread or operating system process). This can occur, for example, when the code in the source agent seeks to access or make use of a special attribute that is associated with the target agent. The source agent can invoke a function in the target agent in order to execute the code, but before doing so, the source agent must transfer to the target agent the input data (e.g., the input parameters) required by the code to be executed in the target agent. Additionally, output data (e.g., return values) generated by the code may need to be transferred from the target agent back to the source agent.

FIG. 1 depicts a conventional mechanism that can be used to transfer data between agents. The mechanism depicted in FIG. 1 is sometimes referred to as function call or parameter marshaling. In function call marshaling, a first agent 10 invokes a proxy function, which packages the input data into a data structure 102. The data structure 102 is then transferred to a second agent 20, where a stub function converts the data structure 102 into the actual parameters with which the desired function is to be invoked. After the desired function has been executed, return values are processed in a similar manner—a proxy function in the agent 20 packages the return values into a data structure 104, which is then transferred to the agent 10 and converted into data values to be used by the code executing in the agent 10. Function call marshaling is typically used when the source and target agents are in different address spaces (particularly when they are on different machines), but it can also be used when the source and target agents are in the same address space.

SUMMARY

The present invention provides methods and apparatus, including computer program products, that implement techniques for transferring the flow of control between agents.

In one general aspect, the techniques feature operations, which are caused by instructions in a computer program product. These operations include storing data on a first call stack, the first call stack corresponding to and being used by a first agent; suspending the first agent's use of the first call stack; enabling a second agent to access the data by using the first call stack; and resuming the first agent's use of the first call stack after the second agent is no longer using the first call stack. Suspending the first agent's use of the first call stack can involve generating a second call stack for use by the first agent; and initiating use of the second call stack by the first agent in place of the first call stack.

The operations can further include generating a third call stack, the third call stack corresponding to and being used by the second agent, and enabling the second agent to access the data can involve initiating use of the first call stack by the second agent in place of the third call stack. The operations can further include identifying a first context associated with the first agent, the first context including a first stack pointer, the first stack pointer referencing the first call stack; generating a second context, the second context including a second stack pointer, the second stack pointer referencing the second call stack; and generating a third context, the third context being associated with the second agent and including a third stack pointer, the third stack pointer referencing the third call stack. Moreover, initiating use of the second call stack by the first agent can involve associating the first agent with the second context in place of the first context, and initiating use of the first call stack by the second agent can involve associating the second agent with the first context in place of the third context.

Resuming the first agent's use of the first call stack can involve associating the first agent with the first context in place of the second context. Each context can include a corresponding program counter that references a corresponding instruction. Associating the first agent with the second context can result in the first agent executing the instruction referenced by the second program counter in place of the instruction referenced by the first program counter, and associating the second agent with the first context can result in the second agent executing the instruction referenced by the first program counter in place of the instruction referenced by the third program counter.

Enabling the second agent to access the data can involve sending a signal to the second agent to begin using the first call stack. The operations can include receiving a signal from the second agent, the signal indicating that the second agent is no longer using the first call stack, and the operations also can include generating the second agent.

The operations can further include maintaining a usage count associated with the second agent; and terminating the second agent when the usage count reaches zero. Maintaining the usage count can involve selectively incrementing the usage count when the second agent begins using the first call stack; and selectively decrementing the usage count when the second agent is no longer using the first call stack. Additionally, the first agent can be a green thread, and the second agent can be a native operating system thread. Moreover, the first agent can be a background thread, and the second agent can be a foreground thread.

According to another aspect of the invention, a computer program product includes a first set of instructions that is operable to store and access data on a shared call stack; and a second set of instructions that is operable to alternate execution of the first set of instructions between a first agent and a second, distinct agent by: (1) alternately associating the first agent with a shared context and a first context, the shared context including a program counter referencing the first set of instructions and a stack pointer referencing the shared call stack, the first context including a program counter referencing a third set of instructions and a stack pointer referencing a first call stack; and (2) alternately associating the second agent with the shared context and a second context, the second context including a program counter referencing a fourth set of instructions and a stack pointer referencing a second call stack. The second set of instructions can include a series of calls to a swapcontext( ) function; the third set of instructions can include a first holding function; and the fourth set of instructions can include a second, distinct holding function.

According to another aspect of the invention, a computer program product includes instructions operable to cause data processing apparatus to: store data on a first call stack, the first call stack corresponding to and being used by a first thread; identify a first context associated with the first thread, the first context including a first stack pointer and a first program counter, the first stack pointer referencing the first call stack, the first program counter referencing a next instruction in a first section of code; generate a second thread and a second context associated with the second thread, the second context including a second stack pointer and a second program counter, the second stack pointer referencing a second call stack, the second call stack corresponding to and being used by the second thread, the second program counter referencing a next instruction in a second section of code; generate a third context, the third context including a third stack pointer and a third program counter, the third stack pointer referencing a third call stack, the third program counter referencing a next instruction in a third section of code; associate the first thread with the third context, wherein associating the first thread with the third context results in the first thread using the third call stack in place of the first call stack and executing the next instruction in the third section of code; associate the second thread with the first context, wherein associating the second thread with the first context results in the second thread using the first call stack in place of the second call stack and executing the next instruction in the first section of code; and after the second thread has accessed the data on the first call stack: associate the second thread with the second context in place of the first context; and associate the first thread with the first context in place of the third context.

The techniques described in this specification can be implemented to realize one or more of the following advantages. The techniques can be used to hand over control of a stack (and hence to change the flow of control) at any point in the execution of code. Conventional function call marshaling requires the explicit creation of a data structure and the forwarding of that data structure to the target agent, and such operations can normally only be carried out at a defined interface such as a function boundary. In contrast, transferring control of a call stack is generally not dependent on any interface, which means that stack marshaling can be used to transfer the flow of control between agents not just at a defined interface such as a function call, but at any point in the execution of code. This allows code that appears to be linear—e.g., code that is part of a single function—to be executed by multiple agents, meaning that the flow of control can change between the agents as the code is executed.

For example, a portion of code in one function can execute in one agent (placing data to be shared on the call stack), and, while still in the same function, control of the stack can then be transferred to a second agent. A second portion of the code can then execute in the second agent (accessing the data on the call stack and placing return data on the call stack).

Control of the stack can then be transferred back to the first agent, so that another portion of the code—still in the same function—is then executed in the first agent. Control of the stack can thus be transferred at any time, with various agents executing different sections of code in the same function. From a runtime perspective, the code (e.g., code that accesses or modifies a certain attribute) is being executed by different agents (e.g., agents that can modify the attribute more easily, or for whom the attribute has a desired setting), but because the flow of control can be transferred between agents at any point during the execution of the code, from a programming perspective, the code can be written by a programmer as linear code that would normally be executed by one agent.

Stack marshaling can also be thought of as a technique for marshaling data between agents that share an address space. Data can be marshaled between agents by placing the data on a call stack and then transferring control of the call stack from one agent to another. Although the transfer of data is in reality simply a side effect of the transfer of control between agents, the use of such a stack-based technique to marshal data between agents can obviate the need for proxy and stub functions, and for the conversion of data in general. Parameters and return values can be transferred between agents in their native format by simply placing such data on a call stack and then handing over control of the call stack to a target agent. Agents do not even need to take explicit actions to place data on the call stack, as such data (e.g., values of function parameters and local variables) is normally automatically placed on the call stack as code executes.

Stack marshaling does not necessarily provide a performance advantage over conventional function call marshaling. Whether stack marshaling will outperform conventional function call marshaling generally depends on the size and complexity of the data to be transferred, as well as on the effort required to transfer control of a call stack. Conventional function call marshaling may be faster in certain circumstances, such as when a relatively small amount of simple data needs to be transferred. However, stack marshaling can provide significant advantages over conventional function call marshaling in terms of flexibility and ease of use.

First of all, stack marshaling is a generic technique that can generally be used with any data (e.g., any types of parameters and return values) and any agents that share an address space. With conventional function call marshaling, conversion routines may need to be re-written when data types change (which can occur, for example, when a function to be executed in a target agent is updated with a new signature or interface), or when data is sent to or received from new agents. In contrast, stack marshaling does not necessarily require changes in such circumstances—new types of data can be placed on the stack, and control of the stack can be given to new agents, using the same approach as before.

Moreover, stack marshaling can provide greater predictability, because the overhead required to transfer control of a stack to a target agent generally stays the same and does not depend on the types of data or the identity of the target agents. Accordingly, stack marshaling may be more suitable to use in environments that require a bounded response time, such as real-time environments.

One implementation of the invention provides all of the above advantages.

These general and specific aspects can be implemented using a computer program, a method, a system or apparatus, or any combination of computer programs, methods, or systems. The details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

As described above, a source agent sometimes seeks to execute code in a target agent, for example, in order to provide the code with access to an attribute that has a desired setting in the target agent, or that is easier to modify in the target agent. Examples of such attributes include the scheduler with which an agent is associated (e.g., a kernel or native scheduler versus a user-level or "green-threaded" scheduler), the resources associated with or owned by an agent (e.g., specific windows in a graphical user interface (GUI) environment), or other attributes, such as attributes that are determined based on the manner in which an agent is registered with a particular framework (e.g., the thread concurrency model, which is determined upon registration with the Component Object Model (COM) framework developed by Microsoft Corp. of Redmond, Wash.)

Figure 1:
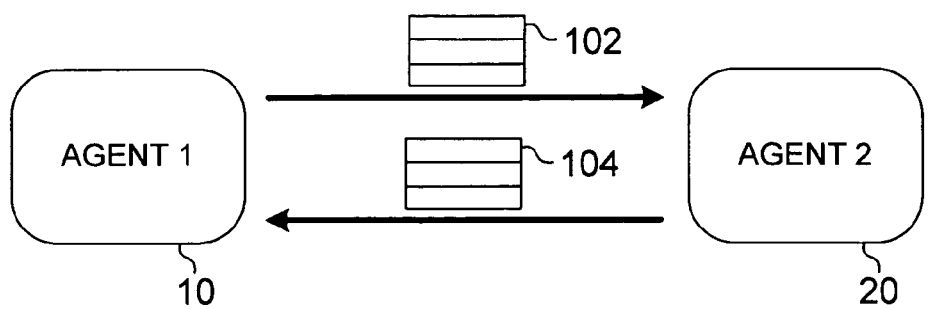
FIG. 1 illustrates the use of a conventional mechanism to marshal data between agents.
Figure 2:
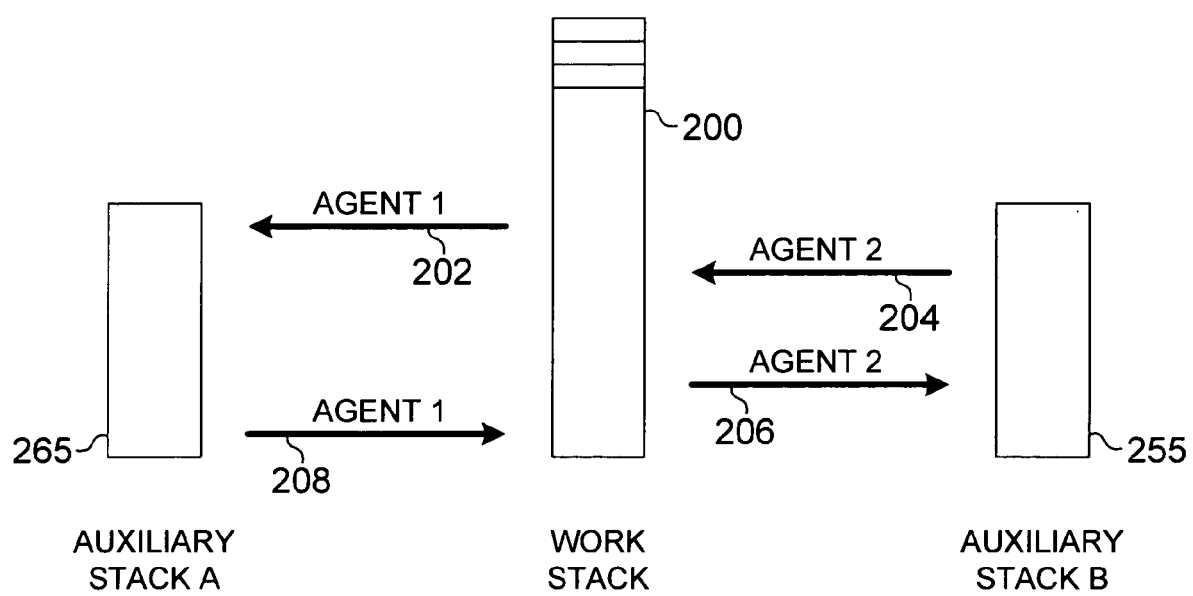
FIG. 2 illustrates the use of a stack to marshal data between agents.

In all of the scenarios above, before the desired code can be executed in the target agent, the input data (e.g., the input parameters) required by the code must be transferred to the target agent. FIG. 2 illustrates a different mechanism—a stack marshaling mechanism—that can be used to effect such a transfer in place of the conventional functional call marshaling mechanism shown in FIG. 1. In the stack marshaling mechanism illustrated in FIG. 2, the source agent places the data to be transferred on its call stack (shown as the work stack 200 in FIG. 2), and then hands control of the stack over to the target agent. The target agent then uses the stack as its own call stack, and when it is done, it can place return data (e.g., return values) on the stack, and return control of the stack back to the source agent. As specified previously, data can be automatically placed on a call stack during execution of a particular section of code. In this manner, the flow of control can transfer between the source agent and the target agent as the code is executed, with the agents making use of a built-in call stack to transfer the needed data.

The use of a call stack to marshal data between agents can provide numerous benefits. First, data can be placed on the stack in its native format—no conversions need take place. As such, stack marshaling is independent of data types, and can generally be used with any parameters and return values. Moreover, stack marshaling is also independent of agent types, and can generally be used with any agents. In general, any type of data can be placed on a call stack, and any agent in the same address space can be allowed to use the stack.

Rather than characterizing stack marshaling as a way of transferring data between agents, stack marshaling can also be thought of as a way of transferring agents between data—and more importantly, between the code associated with the data (i.e., the code that creates and uses the data on the call stack). That is, stack marshaling can be characterized as a technique for altering the flow of control of a program between multiple agents.

The use of a call stack is normally exclusive, meaning that only one agent can use a call stack at a time. Consequently, auxiliary stacks can be created for the source and target agents to use when they are not using the work stack, and access to the work stack is coordinated between the agents. In one implementation, such coordination is achieved by having the agents signal each other (e.g., using messages sent through sockets) when they are no longer using the work stack (and hence when the other agent can begin using the work stack).

The arrows in FIG. 2 show a sequence of transitions that can occur in a sample stack marshaling mechanism. In the beginning, agent 1 (the source agent) is associated with its original call stack, shown as the work stack 200. Agent 2 (the target agent) is associated with its own original call stack, shown as the auxiliary stack 255. After agent 1 has placed the input parameters on its call stack (the work stack 200), agent 1 is associated 202 with the auxiliary stack 265. Agent 1 then signals agent 2 that it can begin to use the work stack 200. Upon receiving that signal, agent 2 is associated 204 with the work stack 200 in place of the auxiliary stack 255. Agent 2 can then use the work stack 200 as its own call stack, accessing parameters and placing return values on the stack as it normally would.

When agent 2 is finished using the work stack 200, the sequence is reversed: Agent 2 is first associated 206 with the auxiliary stack 255 in place of the work stack 200; agent 2 then signals agent 1 that it can begin using the work stack 200 again; and finally agent 1 is associated 208 with the work stack 200 in place of the auxiliary stack 265. Agent 1 can then resume using the work stack 200 as its own call stack.

In one implementation, the call stack with which an agent is associated is changed by changing the context with which the agent is associated. A context basically includes the saved content of a set of CPU (central processing unit) registers, including both the stack pointer (SP) and the program counter (PC). By changing an agent's context—e.g., using the swapcontext( ) function in the Unix operating system or equivalent functions in other operating systems—an agent can be associated with a different call stack, as well as with a different section of program code.

Stack marshaling can thus be implemented with a series of swapcontext( ) calls. Referring again to the example in FIG. 2, agent 1 initially executes in the work context, which includes a stack pointer that references the work stack 200, and a program counter that references user code in a main program. Agent 2 initially executes in an auxiliary context that shall be referred to as auxiliary context B. Auxiliary context B includes a stack pointer that references an auxiliary stack B (e.g., the auxiliary stack 255). Auxiliary context B also includes a program counter that references a holding function that shall be referred to as HOLD_B( ). HOLD_B( ) is a simple looping function that waits for a signal from agent 1 and then associates agent 2 with the work context. This initial setup is shown at the beginning of the timeline in FIG. 3.

Figure 3:
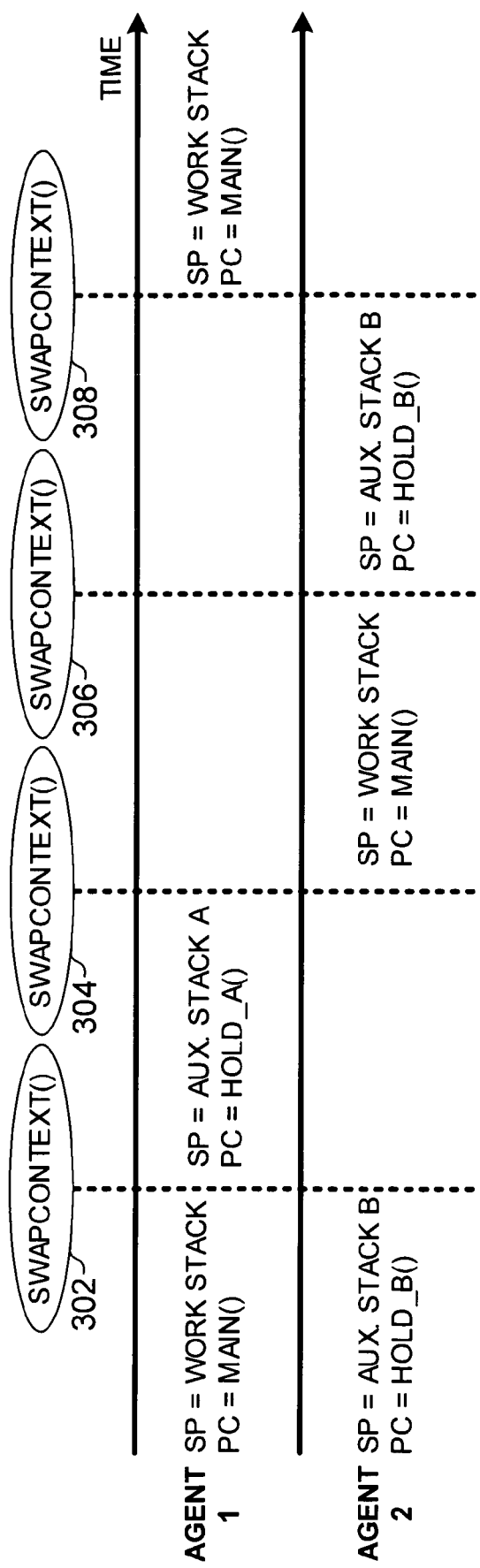
FIG. 3 illustrates a series of context switches in one implementation of a stack marshaling mechanism.

When agent 1 wants to give control of the work stack to agent 2, it invokes swapcontext( ) to associate 202 itself with another auxiliary context that shall be referred to as auxiliary context A. Auxiliary context A includes a stack pointer that references an auxiliary stack A (e.g., the auxiliary stack 265), and a program counter that references a holding function that shall be referred to as HOLD_A( ). HOLD_A( ) is a simple looping function that sends a signal from agent 1 to agent 2 (to let agent 2 know that it can begin using the work context), waits to receive a return signal from agent 2 (which indicates that agent 1 can resume using the work context), and then invokes swapcontext( ) to associate agent 1 with the work context again. The setup after the first swapcontext( ) call 302 is shown in FIG. 3: Agent 1 is now using auxiliary stack A and executing the code in HOLD_A( ).

As just explained, HOLD_A( ) includes code that causes agent 1 to send a signal to agent 2. Upon receiving this signal, agent 2 invokes a second swapcontext( ) call 304 to associate 204 itself with the work context. The result after the second swapcontext( ) call 304 is shown in FIG. 3: Agent 2 is now using the work stack 200 and executing the code in the main program (essentially picking up where agent 1 left off after the first swapcontext( ) call). Agent 2 then executes that code and accesses the work stack as its own call stack (e.g., by reading the parameters left on the call stack by agent 1, and writing return values to the call stack).

When agent 2 has finished using the work context (e.g., when it reaches the end of the code in the main program that is to be executed in agent 2), agent 2 can invoke a third swapcontext( ) call 306 to associate 206 itself with auxiliary context B once more. The result after the third swapcontext( ) call 306 is shown in FIG. 3: Agent 2 is now back to using auxiliary stack B and executing the code in HOLD_B( ). The code in HOLD_B( ) includes an instruction to send a signal to agent 1 to let it know that it can resume using the work context, and a loop back to the beginning of HOLD_B( ), where agent 2 can wait to receive another signal from agent 1 if it is to execute code in the work context again.

When agent 1 receives the signal from agent 2 to indicate that it can resume using the work context, agent 1 invokes a fourth swapcontext( ) call 308 to associate 208 itself with the work context once more. The result after the fourth swapcontext( ) call 308 is shown in FIG. 3: Agent 1 is now back to using the work stack 200 and executing the code in the main program (essentially picking up where agent 2 left off after the last swapcontext( ) call). Agent 1 then executes that code and accesses the work stack as its own call stack, which is essentially the situation in which it started before the very first swapcontext( ) call. A similar series of calls to swapcontext( ) can then be made to transfer control of the work stack and execution of the code in the main program to agent 2, or to another target agent.

In essence, then, stack marshaling is a technique in which a source agent puts data on its call stack and then suspends its use of the stack. A target agent then takes over control of the stack (by using it as its own call stack). When the target agent is done, it returns control of the stack back to the source agent, which allows the source agent to resume using the stack as its own call stack.

Stack marshaling can thus be characterized as a synchronous stack switching technique. Synchronous stack switching normally involves the switching of S stacks between A agents, where S>A. In this scenario, there are more stacks than agents, and the stacks essentially compete for an available agent. For example, in a cooperative multi-tasking environment such as green thread scheduling, there are usually more stacks (corresponding to green threads) than agents (corresponding to available operating system processes in which the green threads can execute). In this example, agents can switch between stacks when a green thread cooperatively yields control to a scheduler.

In contrast, stack marshaling involves the use of stack switching in a scenario where the agents outnumber the stacks (i.e., where A>S). For example, two or more agents can compete for the use of one work stack. To make stack switching work in this scenario, auxiliary stacks and contexts can be created for the agents that are not using the work stack. Moreover, access to the work stack is coordinated between the multiple agents (e.g., through the use of messaging signals) so as to prevent the agents from trying to use the work stack simultaneously. (If the auxiliary stacks are counted, then of course the total stack count becomes greater than the number of agents. However, the number of "real" stacks—i.e., stacks with real data that is to be accessed by the agents—is still less than the number of agents.)

An example implementation of a stack marshaler will now be presented in pseudo-code. This example implementation allows code generally running on a first agent (agent 1, which can be, for instance, a green thread) to temporarily run on a second agent (agent 2, which can be, for instance, a native thread). The main user code is shown below:

```
main(void)
{
    /* code here is executed on agent 1 */
    ...
    enterAgent2(getThreadEnv( ), TRUE);
    /* code here is executed on agent 2 */
    ...
    /* temporary "call back" to agent 1 */
    leaveAgent2(getThreadEnv( ), FALSE);
    /* code here is executed on agent 1 */
```

-continued

```
    ...
    enterAgent2(getThreadEnv( ), FALSE);
    /* code here is executed on agent 2 */
    ...
    /* leave agent 2 and return to agent 1 for good */
    leaveAgent2(getThreadEnv( ), TRUE);
    /* code here is executed on agent 1 */
    ...
}
```

As can be seen, the pseudo-code above includes code be executed in agent 1, as well as code to be executed in agent 2. The latter code can be identified as such by the call to the enterAgent2( ) function preceding the code, and the call to the leaveAgent2( ) function following the code. As this example shows, stack marshaling allows code that appears to be linear to execute in multiple agents. This is because control of a current context (including the stack pointer and the program counter associated with the context) can be transferred between agents at any point in the execution of a program.

The enterAgent2( ) and leaveAgent2( ) functions include two parameters—an environment parameter that identifies the current environment, and a Boolean parameter that determines whether to increment or decrement a usage counter associated with agent 2. In the current example, agent 2 is generated on demand—i.e., it is generated the first time that it is needed. In general, agent 2 can be terminated after it is used, and re-generated when it is needed again. For the sake of efficiency, however, a usage counter is maintained so that agent 2 can be preserved if it is known that it will be needed again shortly.

Thus, in the pseudo-code above, the first call to leaveAgent2( ) includes a FALSE second parameter, which indicates not to decrement the usage counter for agent 2, since agent 2 is to be used again to execute additional code. Similarly, the subsequent call to enterAgent2( ) includes a FALSE second parameter, which indicates not to increment the usage counter, because this is a continued use of agent 2. Only the first call to enterAgent2( ) and the last call to leaveAgent2( ) include TRUE as the second parameter; these values indicate that the usage counter should be increased the first time agent 1 passes control to agent 2, and decreased the last time agent 2 passes control back to agent 1. If the usage counter decreases to 0 at that time, agent 2 can then be terminated.

Although used primarily for efficiency, in some situations, a usage counter may be required for correct program execution. For example, in some environments, the code executing in agent 2 may assume the existence of previously saved storage (e.g., local thread storage). In such environments, agent 2 may need to be preserved and re-used in order for the code to execute correctly.

The data structure below defines a group of contexts used in the remainder of the pseudo-code:

```
struct contextGroup {
    int usageCounter;
    ucontext_t contextWork;
    ucontext_t contextA;
    ucontext_t contextB;
    int socketA;
    int socketB;
    char stackA[STACK_SIZE];
}
```

The data structure references three contexts—a work context, a first auxiliary context (context A), and a second auxiliary context (context B). As in the example discussed in conjunction with FIGS. 2 and 3, the work context is the main context, and it includes references to the work stack and to the main user code (some of which is to be executed in agent 1, and some of which is to be executed in agent 2). Contexts A and B are auxiliary contexts to be used by agents 1 and 2 (respectively) when the agents are not using the work context. Context A includes a reference to an auxiliary stack A and to a holding function to be executed by agent 1 (hold_A( ), described below). Similarly, context B includes a reference to an auxiliary stack B and to a holding function to be executed by agent 2 (hold_B( ), described below).

In the data structure above, space is only explicitly allocated for stack A. This is because space for the work stack is automatically allocated when agent 1 is generated, and space for stack B is automatically allocated when agent 2 is generated. The data structure above also includes two sockets, which are used to enable communication between agents 1 and 2.

As with the example discussed in conjunction with FIGS. 2 and 3, agent 1 begins executing in the work context, which means that it executes the code in the main( ) function above and uses the work stack as its call stack. When agent 1 reaches code to be executed in agent 2, it executes the enterAgent2( ) function, shown below:

```
enterAgent2(ThreadEnv *env; Bool updateUsageCounter)
{
    /* check if the context group has been initialized;
        if not:
            create the temporary context for agent 1 (i.e., context A)
            then, create agent 2 and its context (i.e., context B)
    */
    contextGroup *context = env->contextGroup;
    if (context == NULL) {
        context = malloc(sizeof(*contextGroup));
        env->contextGroup = context;
        context->usageCounter = 0;
        /* pair agents 1 and 2 by creating, binding,
            and connecting two sockets */
        socketPairInit(context);
        getcontext(&context->contextA);
        context->contextA.uc_stack.ss_sp = context->stackA;
        context->contextA.uc_stack.ss_size = sizeof(context->stackA);
        context->contextA.uc_stack.ss_flags = 0;
        context->contextA.uc_link = 0;
        makecontext(&context->contextA, (void (*)(void) hold_A, 1, context);
        /* Create agent 2 via runtime library */
        _beginthread(hold_B, STACK_SIZE, context);
    }
    if (updateUsageCounter) context->usageCounter++;
    /* switch agent 1 to context A
        -- note that after the swapcontext( ) call below, agent 1
            picks up execution either at the beginning of hold_A or at
            Jump Point 4
    */
    swapcontext(&context->contextWork, &context->contextA);
    /* Jump Point 1: When agent 2 switches to the work context,
        (by the swapcontext( ) call in hold_B), it picks up execution
        at this point
    */
}
```

The enterAgent2( ) function first checks to see if the group context structure has been initialized. If so, that means that agent 2 has already been generated, and the function can simply proceed with the swapcontext( ) call described below.

If the group context structure has not been initialized, the function allocates space for, generates, and initializes the auxiliary context A. In so doing, the function indicates that when context A is initially used, program execution should begin at the function hold_A( ) (described below). In addition, the enterAgent2( ) function generates agent 2 through the call to _beginthread( ). The generation of agent 2 automatically generates context B, including the auxiliary stack B—that is, when agent 2 is generated, a stack is automatically allocated for it. That stack is used by the stack marshaling mechanism as auxiliary stack B. The _beginthread( ) function also specifies that when agent 2 begins executing in context B, it should execute the function hold_B( ) (described below). The _beginthread( ) function, which is part of the Microsoft Visual C++ runtime library, is an example of a function that can be used to generate agent 2 and context B. Other operating system functions can also be used, though the use of such functions could require different implementations than the code shown above, depending on what the functions do.

The enterAgent2( ) function then increments the usage counter associated with the context group if the input parameter updateUsageCounter so indicates. As discussed above, the usage counter can be used to preserve agent 2 (as well as the auxiliary contexts), so that they do not need to be re-created every time code needs to be executed in agent 2.

Finally, the enterAgent2( ) function calls swapcontext( ), which associates agent 1 with context A in place of the work context. This swapcontext( ) call corresponds to the first swapcontext( ) call 302 shown in FIG. 3, and to the transfer of agent 1 shown by the arrow 202 in FIG. 2. Note that after the swapcontext( ) call, the program counter in the work context is left at Jump Point 1 (i.e., just after the swapcontext( ) call). Accordingly, when agent 2 is associated with the work context, it will pick up execution at this point. Since Jump Point 1 marks the end of the enterAgent2( ) function, that means agent 2 will return to and continue execution in the main( ) function.

After the swapcontext( ) call specified above, agent 1 begins execution in the hold_A( ) function shown below:

```
hold_A(contextGroup *context)
{
    char dummy;
    for (;;) {
        send(context->SocketA, &dummy, sizeof(dummy), 0);
        recv(context->socketA, &dummy, sizeof(dummy), 0);
        /* switch agent 1 back to the work context
            -- note that after the swapcontext( ) call below, agent 1
                picks up execution at Jump Point 2
        */
        swapcontext(&context->contextA, &context->contextWork);
        /* Jump Point 4: If agent 1 is switched back to context A
            at some time (by the swapcontext( ) call in enterAgent2),
            it picks up execution at this point
        */
    }
}
```

The hold_A( ) function is a simple looping function that first sends a message to agent 2 to tell it that it can begin using the work context. The function then waits for a return message, which indicates that agent 1 can begin using the work context again. The recv( ) function is a blocking function, which means that the swapcontext( ) call below it, which returns agent 1 to the work context, will not be executed until agent 1 receives the return message from agent 2.

When agent 2 begins execution in context B, it executes the function hold_B( ), shown below:

```
hold_B(contextGroup *context)
{
    char dummy;
    Bool inUse;
    do {
        recv(context->socketB, &dummy, sizeof(dummy), 0);
        /* switch agent 2 to the work context
            -- note that after the swapcontext( ) call below, agent 2
               picks up execution at Jump Point 1
        */
        swapcontext(&context->contextB, &context->contextWork);
        /* Jump Point 3: When agent 2 is switched back to context B
            (by the swapcontext( ) call in leaveAgent2), it picks up
            execution at this point
        */
        inUse = (context->usageCounter > 0);
        send(context->socketB, &dummy, sizeof(dummy), 0);
    } while (inUse);
}
```

Like hold_A( ), hold_B( ) is a simple looping function that waits for an appropriate signal (sent by agent 1 to indicate that agent 2 can begin using the work context). When the signal is received, the function calls swapcontext( ), which associates agent 2 with the work context in place of context B. This swapcontext( ) call corresponds to the second swapcontext( ) call 304 shown in FIG. 3, and to the transfer of agent 2 shown by the arrow 204 in FIG. 2. Note that after the swapcontext( ) call, the program counter in context B is left at Jump Point 3 (i.e., just after the swapcontext( ) call). Accordingly, when agent 2 is associated with context B once more, it will pick up execution at this point, which means that it will send a signal to agent 1 to indicate that agent 1 can begin using the work context, and then loop around (assuming the usage counter is greater than 0) and wait for a signal from agent 1 to indicate that agent 2 should switch back to the work context.

When agent 2 is in the work context and executing the code in main( ), it may eventually reach an invocation of the leaveAgent2( ) function, shown below:

```
leaveAgent2(ThreadEnv *env, Bool updateUsageCounter)
{
    contextGroup *context = env->contextGroup;
    if (updateUsageCounter) context->usageCounter--;
    /* switch agent 2 to context B
        -- note that after the swapcontext( ) call below, agent 2
           picks up execution at Jump Point 3
    */
    swapcontext(&context->contextWork, &context->contextB);
    /* Jump Point 2: When agent 1 switches back to the work context
        (by the swapcontext( ) call in hold_A), it picks up execution
        at this point
    */
    /* clean up context group if the usage counter reaches 0 */
    if (context->usageCounter == 0) {
        socketPairDestroy(context);
        free(context);
        env->contextGroup = NULL;
    }
}
```

The leaveAgent2( ) function first decrements the usage counter associated with the context group if the input parameter updateUsageCounter so indicates.

The leaveAgent2( ) function then calls swapcontext( ), which associates agent 2 with context B in place of the work context. This swapcontext( ) call corresponds to the third swapcontext( ) call 306 shown in FIG. 3, and to the transfer of agent 2 shown by the arrow 206 in FIG. 2.

As explained above, once returned to context B, agent 2 sends a signal to agent 1, which triggers the swapcontext( ) call in the hold_A( ) function. That swapcontext( ) call corresponds to the fourth swapcontext( ) call 308 shown in FIG. 3, and to the transfer of agent 1 shown by the arrow 208 in FIG. 2.

Note that after the swapcontext( ) call in leaveAgent2( ), the program counter in the work context is left at Jump Point 2 (i.e., just after the swapcontext( ) call). Accordingly, when agent 1 is associated with the work context again, it will pick up execution at that point. Thus, agent 1 will clean up the context group if the usage counter reaches 0, and then return to and continue execution in the main( ) function.

Figure 4:
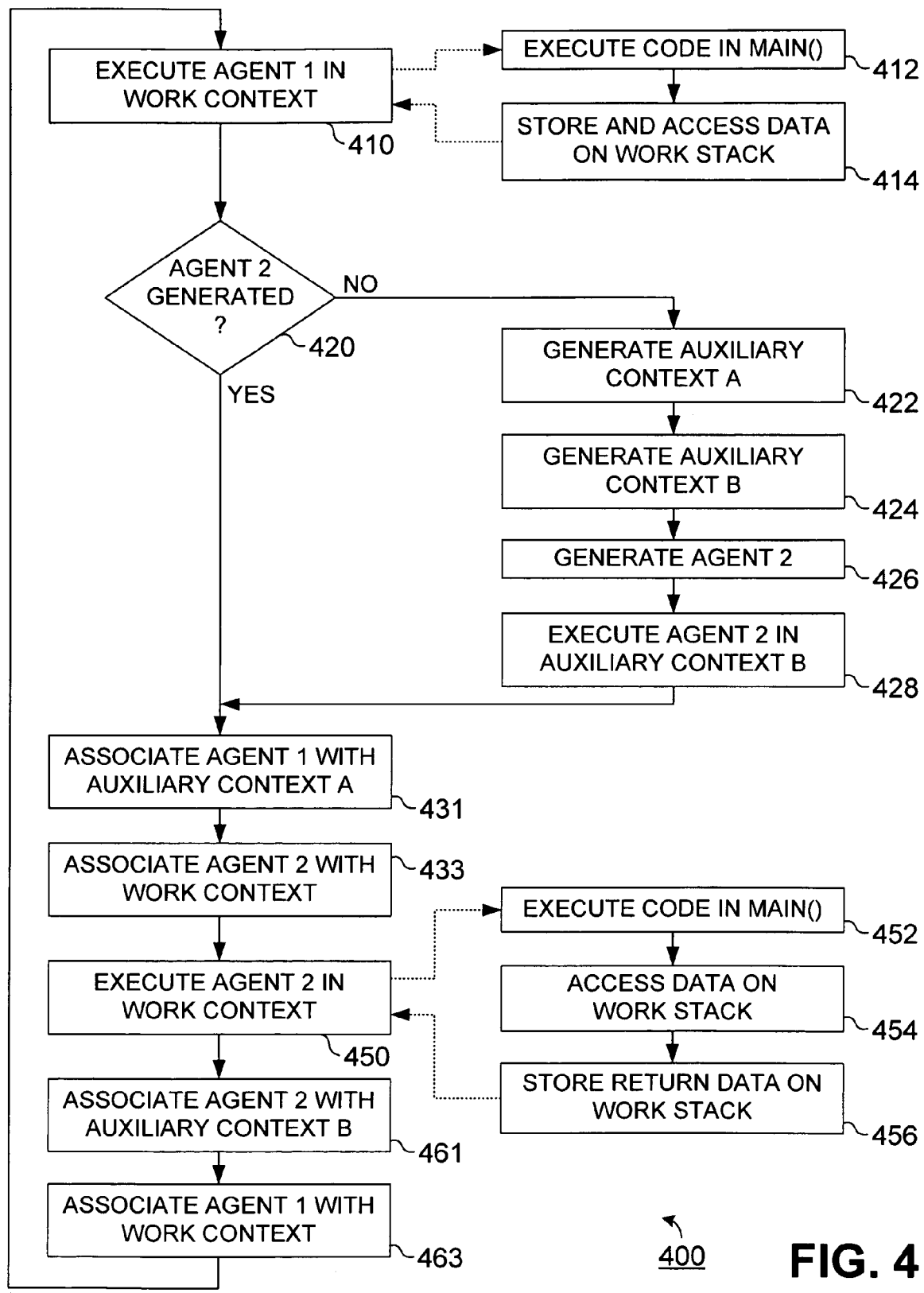
FIG. 4 is a process flowchart illustrating a stack marshaling mechanism.

FIG. 4 illustrates the stack marshaling mechanism implemented by the pseudo-code above in flowchart form. As shown in FIG. 4, agent 1 initially executes in the work context (410), which means that it executes the code in the main( ) function (412), and stores and accesses data on the work stack (414). When it reaches code to be executed by agent 2, it first checks to see whether agent 2 exists (420). If not, agent 1 generates the auxiliary contexts A and B (422 and 424), and generates agent 2 (426), which initially executes in context B (428). In some implementations, the generation of auxiliary context B can occur automatically as part of the generation of agent 2.

After agent 2 and the auxiliary contexts have been generated, agent 1 is associated with context A instead of the work context (431), which in effect suspends agent 1's use of the work context. Agent 2 is then associated with the work context in place of context B (433). This allows agent 2 to execute in the work context (450), which means that it can execute the code in the main( ) function (starting where agent 1 left off), and access and store data on the work stack (452, 454, and 456).

Finally, when agent 2 reaches code to be executed by agent 1, it reverses the previous associations: First, agent 2 is associated with context B in place of the work context (461), and then agent 1 is associated with the work context in place of context A (463). This allows agent 1 to resume execution in the work context (410), which means that it can execute the code in the main( ) function (starting where agent 2 left off), and access and store data on the work stack.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 4 does not require the particular order shown, or sequential order, to achieve desirable results (e.g., the operations to generate the auxiliary contexts A and B can be performed at different places within the overall process). In certain implementations, multitasking and parallel processing may be preferable. Modifications and alternatives are also possible regarding other aspects of the invention, such as the manner in which agents switch stacks and synchronize. It is also possible for different agents to use different stack switching and synchronization techniques within the same implementation. Other embodiments are within the scope of the following claims.

What is claimed is:

1. A machine-readable storage medium comprising instructions which, when executed, cause a machine to:

executing a code and transferring a flow control between multiple agents including a first agent and a second agent while the code is being executed, wherein the instructions when executing the code further cause the machine to store data on a first call stack, the first call stack corresponding to and being used by the first agent, wherein the transferring of the flow control is performed between the first agent and the second agent such that not more than a single agent of the first and second agents is in control of the first call stack, wherein the transferring of the flow control is independent of types of the multiple agents;

suspend the first agent's use of the first call stack;

enable the second agent to access the data by using the first call stack, wherein the enabling of the second agent includes sending a signal to the second agent to begin using the first call stack, and receiving a signal from the second agent indicating that the second agent is no longer using the first call stack;

resume the first agent's use of the first call stack after the second agent is no longer using the first call stack;

maintain a usage count associated with the second agent, terminate the second agent when the usage count reaches zero, selectively increment the usage count when the second agent begins using the first call stack, and selectively decrement the usage count when the second agent is no longer using the first call stack; and provide results of the execution of the code via a display device.

2. The machine-readable storage medium of claim 1, wherein the instructions that are operable to suspend the first agent's use of the first call stack comprise instructions operable to:

generate a second call stack for use by the first agent; and initiate use of the second call stack by the first agent in place of the first call stack.

3. The machine-readable storage medium of claim 2, further comprising instructions operable to:

generate a third call stack, the third call stack corresponding to and being used by the second agent;

wherein the instructions that are operable to enable the second agent to access the data comprise instruction operable to:

initiate use of the first call stack by the second agent in place of the third call stack.

4. The machine-readable storage medium of claim 3, further comprising instructions operable to:

identify a first context associated with the first agent, the first context comprising a first stack pointer, the first stack pointer referencing the first call stack;

generate a second context, the second context comprising a second stack pointer, the second stack pointer referencing the second call stack; and generate a third context, the third context being associated with the second agent and comprising a third stack pointer, the third stack pointer referencing the third call stack;

wherein:

the instructions that are operable to initiate use of the second call stack by the first agent comprise instructions operable to associate the first agent with the second context in place of the first context; and the instructions that are operable to initiate use of the first call stack by the second agent comprise instructions operable to associate the second agent with the first context in place of the third context.

5. The machine-readable storage medium of claim 4, wherein the instructions that are operable to resume the first agent's use of the first call stack comprise instructions operable to associate the first agent with the first context in place of the second context.

6. The machine-readable storage medium of claim 4, wherein:
   each context comprises a corresponding program counter that references a corresponding instruction;
   the instructions that are operable to associate the first agent with the second context result in the first agent executing the instruction referenced by the second program counter in place of the instruction referenced by the first program counter; and
   the instructions that are operable to associate the second agent with the first context result in the second agent executing the instruction referenced by the first program counter in place of the instruction referenced by the third program counter.

7. The machine-readable storage medium of claim 1, further comprising instructions operable to:
   generate the second agent.

8. A method comprising:
   executing a code and transferring a flow control between multiple agents including a first agent and a second agent while the code is being executed, the executing of the code including
      storing data on a first call stack, the first call stack corresponding to and being used by the first agent, wherein the transferring of the flow control is performed between the first agent and the second agent such that not more than a single agent of the first and second agents is in control of the first call stack, wherein the transferring of the flow control is independent of types of the multiple agents;
      suspending the first agent's use of the first call stack;
      enabling the second agent to access the data by using the first call stack, wherein the enabling of the second agent includes sending a signal to the second agent to begin using the first call stack, and receiving a signal from the second agent indicating that the second agent is no longer using the first call stack;
      resuming the first agent's use of the first call stack after the second agent is no longer using the first call stack;
      maintaining a usage count associated with the second agent, terminating the second agent when the usage count reaches zero, selectively incrementing the usage count when the second agent begins using the first call stack, and selectively decrementing the usage count when the second agent is no longer using the first call stack; and
   providing results of the execution of the code via a display device.

9. The method of claim 8, further comprising:
   generating a second call stack for use by the first agent; and
   initiating use of the second call stack by the first agent in place of the first call stack.

10. The method of claim 9, further comprising:
    generating a third call stack, the third call stack corresponding to and being used by the second agent; and
    initiate use of the first call stack by the second agent in place of the third call stack.

11. The method of claim 10, further comprising:
    identifying a first context associated with the first agent, the first context comprising a first stack pointer, the first stack pointer referencing the first call stack;
    generating a second context, the second context comprising a second stack pointer, the second stack pointer referencing the second call stack; and
    generating a third context, the third context being associated with the second agent and comprising a third stack pointer, the third stack pointer referencing the third call stack;
    associating the first agent with the second, context in place of the first context; and
    associating the second agent with the first context in place of the third context.

12. The method of claim 11, further comprising associating the first agent with the first context in place of the second context.

13. A system comprising:
    a server coupled with a client, the server having a processor and a storage medium coupled with the processor, the processor to
       execute a code and transferring a flow control between multiple agents including a first agent and a second agent while the code is being executed, the means for executing the code including
       store data on a first call stack, the first call stack corresponding to and being used by a first agent, wherein the transferring of the flow control is performed between the first agent and the second agent such that not more than a single agent of the first and second agents is in control of the first call stack, wherein the transferring of the flow control is independent of types of the multiple agents;
       suspend the first agent's use of the first call stack;
       enable a second agent to access the data by using the first call stack, wherein the enabling of the second agent includes sending a signal to the second agent to begin using the first call stack, and receiving a signal from the second agent indicating that the second agent is no longer using the first call stack;
       resume the first agent's use of the first call stack after the second agent is no longer using the first call stack;
       maintain a usage count associated with the second agent, terminate the second agent when the usage count reaches zero, selectively increment the usage count when the second agent begins using the first call stack, and selectively decrement the usage count when the second agent is no longer using the first call stack; and
    a display device coupled to the server and the client, the display device to provide results of the execution of the code.

14. The system of claim 13, wherein the processor is further to:
    generate a second call stack for use by the first agent; and
    initiate use of the second call stack by the first agent in place of the first call stack.

15. The system of claim 14, wherein the processor is further to:
    generate a third call stack, the third call stack corresponding to and being used by the second agent; and
    initiate use of the first call stack by the second agent in place of the third call stack.

* * * * *